United States Patent [19]
Yatman

[11] 4,445,181
[45] Apr. 24, 1984

[54] MEETING COST CALCULATOR AND/OR TIMER

[76] Inventor: Teoman Yatman, 11627 Amigo Ave., Northridge, Calif. 91326

[21] Appl. No.: 269,471

[22] Filed: Jun. 2, 1981

[51] Int. Cl.³ .............................................. G06F 15/20
[52] U.S. Cl. ..................................... 364/464; 364/569
[58] Field of Search .................. 346/82; 364/569, 464, 364/715, 709, 401, 406

[56] References Cited

U.S. PATENT DOCUMENTS

| | | | |
|---|---|---|---|
| 3,593,008 | 1/1971 | De Witt et al. | 364/401 |
| 3,806,705 | 4/1974 | Reilly et al. | 235/61.9 R |
| 3,894,215 | 7/1975 | Lotter et al. | 235/61.6 R |
| 3,927,302 | 12/1975 | Lamb et al. | 235/61.9 R |
| 3,932,730 | 1/1976 | Ambrosio | 235/61.9 R |
| 4,011,434 | 3/1977 | Hockler | 235/61.9 R |
| 4,065,663 | 12/1977 | Edwards | 364/569 |
| 4,164,038 | 8/1979 | Nactigal | 364/406 |
| 4,270,043 | 5/1981 | Baxter et al. | 346/82 |

Primary Examiner—Harvey E. Springborn
Attorney, Agent, or Firm—Poms, Smith, Lande & Rose

[57] ABSTRACT

A meeting cost calculator and timer is shown for displaying the total cost of a meeting and the elapsed time thereof. Input switches, each associated with a class of attendee, actuate an adjustable rate indicator which applies its digital signal to an arithmetic logic unit and then to an accumulator in the form of a memory register. A second set of switches add or subtract the rate applied to the accumulator depending whether the attendee is entering or leaving the meeting. A display displays the total rate of the attendees over a period of time as the total cost of the meeting.

17 Claims, 5 Drawing Figures

MEETING COST CALCULATOR AND/OR TIMER

The present invention relates to a calculating and timing device and, more particularly, to a device which indicates the amount of time consumed by a meeting and the total accumulated cost of that meeting as reflected by the average compensation paid to each attendees.

DESCRIPTION OF THE PRIOR ART

It is well known in the prior art to utilize a time clock to establish the time when an employee enters his or her place of employment as well as the time they depart. Early time clocks were mechanical devices incorporating a printing device into which a time card could be inserted. By adjusting a lever mechanism, the time card could be aligned with the printer so that a single print wheel would place an imprint in an appropriate column to check the employee in or out. Mechanical actuation of another lever mechanism would then print the correct time in the selected in or out column.

Mechanical time clocks were later replaced with electronic time clocks which permit the worker to insert a time card into a slot until a switch is depressed, thus actuating a print mechanism for printing the time upon the card. The elapsed time between check in and check out could then be calculated by a clerk reviewing the time card by simply subtracting an earlier time from a later time.

With the development of electronics, the need for a clerk to note check in and check out times and then to record the time worked in a ledger has been eliminated. For example, electronic machines have been developed which automatically scan the time card, record the data and permit manipulation of the recorded data into chosen categories, thus eliminating the need of a clerk. See, for example, U.S. Pat. No. 3,806,705 by R. J. Reilly and G. L. Merrill.

Still other devices have been developed which automatically scan the time card as it is inserted into the time clock and read prerecorded data from a selected region of the card when the time clock printing mechanism is activated. This data may then be applied to suitable storage devices, thus eliminating the need for a clerk to transcribe the data into a ledger. An example of such a device is shown in U.S. Pat. No. 3,927,302 by K. Lamb and R. W. Froud.

It is also desirable to permit the worker who is punching in or out to have a visual feedback of the number of hours he or she has accumulated over a given time period and the exact amount of time he or she has worked during the particular period ending as he or she checks out. A device that provides a visual feedback of such information including accumulation of that individual's time over the pay period is shown in U.S. Pat. No. 4,011,434 by N. H. Hockler.

Many people have a tendency to resent time clocks, perhaps due to a feeling that an electronic big brother is watching. As a result, many classifications of workers are not required to utilize such a device. However, in a capitalistic society which is motivated, in part, by profit, it is necessary to be mindful of the amount of cost and/or time associated with one's endeavors. Regardless of the classification of the employee, he or she must be be mindful of the limitation imposed by the number of hours in a day and the need to complete a task in an efficient and economic manner. For instance, it is difficult to name an organization that does not create a schedule, plan, or budget. Even socialistic and communistic nations use schedules and plans, e.g., a five year plan.

There are human traits, however, that tend to conflict with the need for efficient operation or planning, such as, the tendency of each individual to wish to express his or her thoughts and ideas, especially during a meeting. Thus, it is not uncommon for a business, community or governmental meeting to consume many hours in order to enable those present to express their views. In community and governmental meetings, this expression of views is often the major purpose of the meeting and such time is well spent. However, in business meetings it is generally desirable to accomplish the goal of the meeting and then adjourn.

Many managers or supervisors are faced with the paradox of requiring a meeting to establish budgets, goals, or to iron out problems while still faced with the need for accomplishing the results desired in an economic manner.

SUMMARY OF THE INVENTION

Accordingly, it is an object of the present invention to provide a simple, inoffensive device which will remind the attendees of a meeting of the cost of that meeting and the amount of time elapsed therefor.

It is another object of the present invention to provide the organizer of a meeting with managerial information which will permit him or her to efficiently track the amount of cost and time invested in a meeting to enable that manager to stay with his or her budget.

To accomplish the goal of meeting in an economic manner, a meeting calculator has been invented which comprises an input device including a plurality of input switches, one switch for each class of possible meeting attendee. Each input switch activates a rate selection switch which may be adjusted from time to time to reflect the average compensation of the individuals within that class. The outputs from the rate selection switches are accumulated within a suitable memory device and then applied to a display so that the total cost of the meeting may be displayed. As each individual enters the room, he or she activates the input device which increases the accumulated rate information stored in the memory. Upon departure, the same individual activates the input device again but activates a separate switch to subtract or delete his or her rate from the memory. In this way, the last individual to depart the meeting terminates the accumulation of cost and time.

In order to make the meeting cost calculator and/or timer more innocuous, it is possible for the manager of the meeting to establish a delay which prevents a display of accumulated meeting cost until after a predetermined time. Alternately, the manager of the meeting may simply accumulate the amount of cost and time and print that information for his or her own use without displaying it to the meeting.

DESCRIPTION OF THE DRAWINGS

For a better understanding of the invention summarized above and of the objects and advantages presented thereby, the reader's attention is directed to the following specification and accompanying drawings, wherein.

DESCRIPTION OF THE PREFERRED EMBODIMENTS

Figure 1:
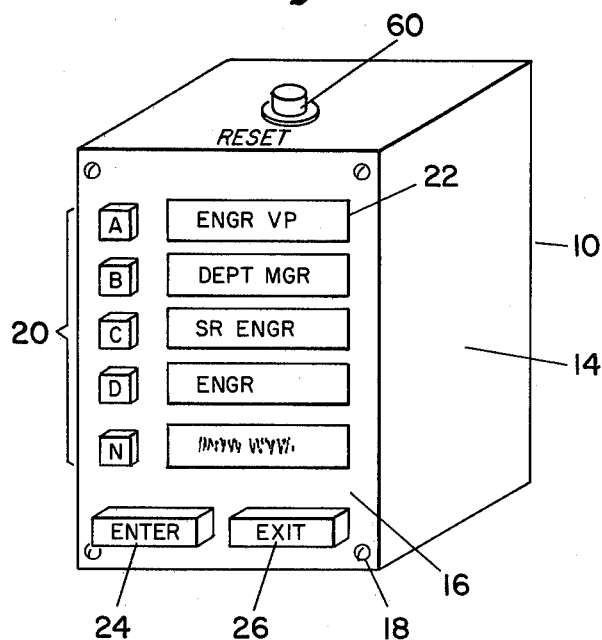
FIG. 1 is a perspective view showing the input device of the present invention.
Figure 2:
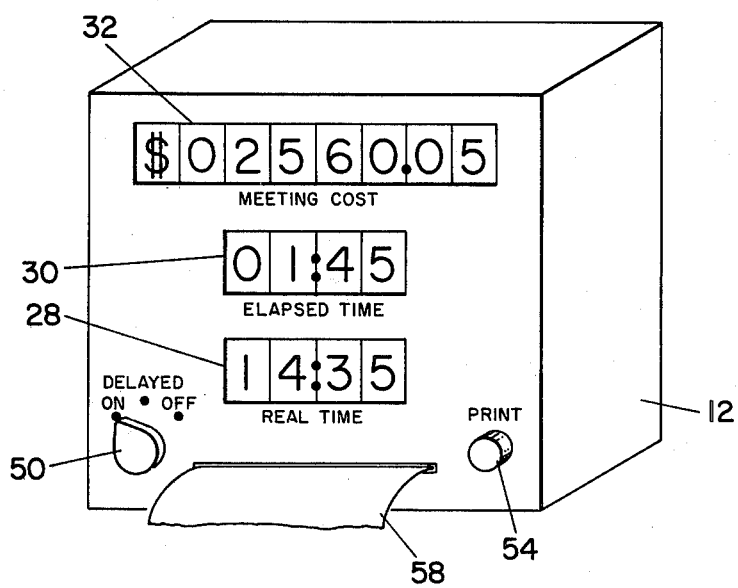
FIG. 2 is a perspective view showing the display device of the present invention.

Referring now to the drawings, the preferred embodiment of the meeting cost calculator and/or timer of the present invention consists of an input device 10, as seen in FIG. 1 and a display device 12, as seen in FIG. 2. The input device 10 is mounted within a molded or drawn box 14 having a cover 16 attached to the box as by screws 18. The cover 16 is provided with a plurality of apertures into which is inserted a plurality of push button switches 20 mounted therein by side mounting clips, not shown. These switches, labeled 20A, B, C, D and N in FIG. 1, may consist of as many switches as required to meet the various classifications of employee within the particular establishment utilizing the meeting calculator/timer.

For example, the input device shown in FIG. 1 has a switch 20 for the engineering vice president, department manager, senior engineers, engineers and others such as draftsmen, technicians, detailers or model makers. Labels 22 may be placed opposite each switch 20 to indicate the classification of employee associated with the particular switch. As each attendee enters the meeting room, he or she activates the appropriate switch 20 adjacent his or her job classification and depresses an enter push button 24. This places a predetermined rate for that class of employee into the memory electronics of the meeting timer to be discussed hereinbelow. As the attendee departs the meeting, he or she depresses the appropriate push button 20 again and then depresses an exit push button 26 which removes the corresponding rate from the meeting timer.

Referring to FIG. 2, the display device 12 includes a real time clock 28 which may be a twenty-four hour digital display and an elapsed time clock 30 which is activated when the first push button 20 in the input 10 is depressed. After the input device 10 has been activated by depression of switch 20, a meeting cost display 32 will periodically indicate the accumulated cost of the meeting.

Figure 3:
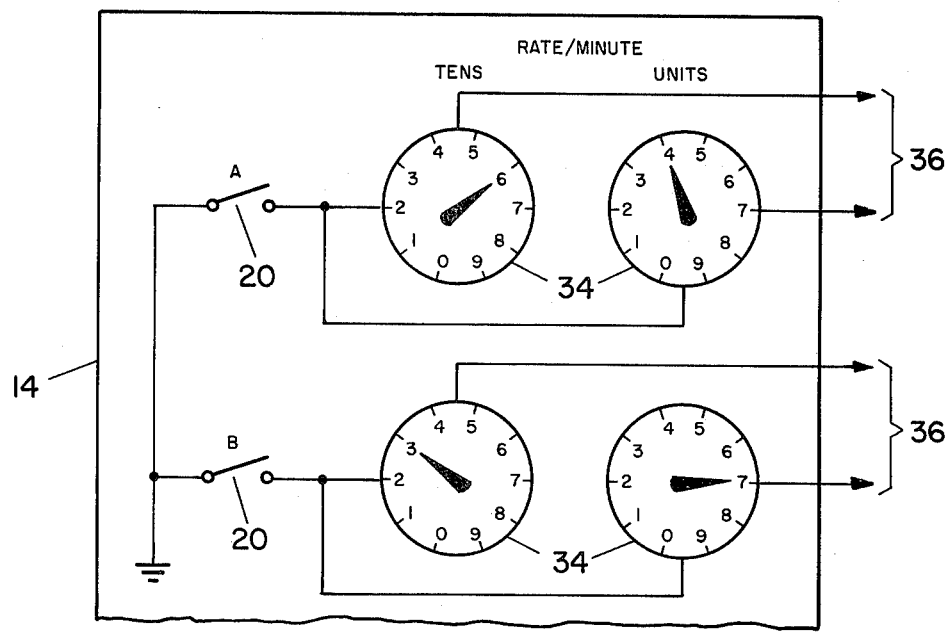
FIG. 3 is a schematic diagram showing the adjustable rate switches of the present invention housed within the input device of FIG. 1.
Figure 4:
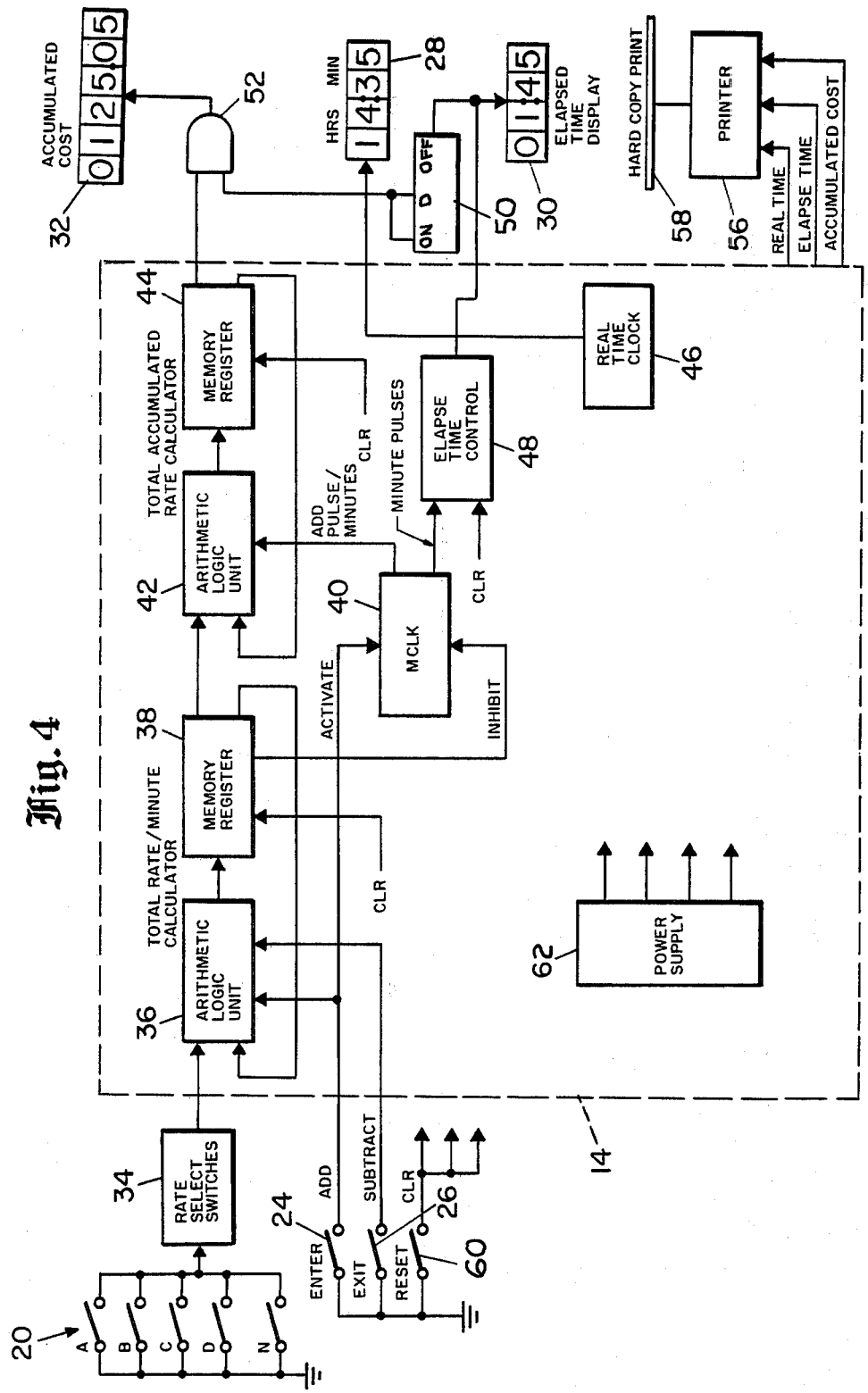
FIG. 4 is a schematic diagram of the meeting calculator/timer of the present invention.

Referring now to FIGS. 3 and 4, the internal electronics of the meeting timer will be described in greater detail. As seen in FIG. 3 depression of switch 20A connects a pair of adjustable rate switches 34 to ground for applying a signal to an arithmetic logic unit 36. The adjustable rate switches 34 may consist of two switches representing units and tens. Adjustment of these switches can represent the amount of dollars per minute that is the average rate of the attendees who depress the switch 20A associated with the class indicated on cover 16.

For example, in FIG. 3 the rate is shown as $0.64 per minute. Clearly, this rate may be expressed in any currency and any unit of time. In a similar manner, depression of switch 20B actuates a second set of rate switches 34 for applying a rate of $0.37 to the arithmetic logic unit 36. As seen in FIG. 4, depression of switch 20A connects the rate select switch 34 to the arithmetic logic unit 36. As the attendee enters the meeting, and after switch 20A is depressed, he or she depresses the button 24 which transfers the rate selected from the arithmetic unit 36 to an accumulator memory register 38. Depression of the second switch 20B applies the second selected rate from switches 34 to the memory register 38 through the arithmetic logic unit 36 and so on.

Once the enter button 24 has been depressed, not only is the logic unit 36 connected to ground through that push button but a master clock 40 is activated. The master clock 40 applies a periodic pulse to a second arithmetic logic unit 42. Logic unit 42 is connected in turn to a second memory register 44. It will now be seen that the first logic unit 36 and memory register 38 form a total rate per minute calculator which accumulate the input from the rate select switches 34 and stores that total accumulated rate within the memory register 38. Similarly, the logic unit 42 and register 44 form a total accumulated rate calculator which periodically applies the total rate per minute stored within register 38 through the logic unit 42 to the memory 44 so that the information stored within register 44 is periodically increased to represent the increasing cost of the meeting.

The accumulated cost of the meeting stored within register 44 is then displayed through a connection to the accumulated cost display 32. The real time clock 28 is driven by electronics 46, as is well known. The master clock 40 also applies a signal to elapse time electronics 48 which drives the elapsed time clock 30. It will now be seen from a review of FIG. 4 that the elapsed time clock 30 is automatically energized when the first push button 20A through N and then push button 24 is depressed for connecting the clock 40 to ground through the memory register 38, logic unit 36 and rate select switch 34. Conversely, the elapsed time clock 30 is stopped when the last attendee exits the meeting room by depressing buttons 20A-N and 26 to reduce the rate stored in register 38 to zero, as discussed hereinbelow.

Should the organizer of the meeting wish to display the total cost of the meeting continuously, a display switch 50 is provided for this purpose, see FIG. 2. As seen in FIG. 4, the display switch and delay device 50 is connected between the elapsed time display clock 30 and of an AND gate 52. With switch 50 in the on position, a constant signal is applied to AND gate 52 for permitting the signal from memory register 44 to pass directly to the cost display 32. Should the meeting organizer wish to delay the display so as to reduce the offensive features of such a display, it is possible to place switch 50 to a delayed position, FIG. 2, which will delay the application of a signal to AND gate 52, thus delaying the display of total cost at display 32. Alternatively, the manager of the meeting may wish to inhibit the display of the total cost altogether by turning switch 50 to the off position.

Even if the manager of the meeting does not wish to display the total cost, he may wish to retain a hard copy indicating the total cost and the amount of time the meeting required. In this situation, the display device 12 is provided with a print switch 54 which may be depressed to activate a printer 56 which will print the time, elapsed time and accumulated cost of the meeting upon a paper slip 58.

As each attendee departs the meeting, he or she again depresses the appropriate employee class switch 20 but this time depresses exit switch 26. As seen in FIG. 4, switch 26 applies a signal to the arithmetic logic unit 36 and thus subtracts from memory 38 the digital signal representing the rate of the departing attendeee programmed within the rate select switches 34. It will be seen from consideration of FIG. 4 that attendees may enter and exit at will without destroying the information stored within memory register 44 representing the total accumulated cost of the meeting. This is accomplished through the utilization of the first memory register 38 which may be updated at any time to reflect the total rate per unit of time of the meeting attendee. Utilization of separate enter and exit switches 24 and 26 permits the simple addition or subtraction required to reflect this total rate.

After the last attendee has exited the meeting, the information stored within register 38 will be reduced to zero when button 26 is depressed. At this time, an inhibit signal is applied from memory register 38 to the master clock to terminate the elapsed time indicated by electronics 48 on display 30. Assuming for the moment that the manager who called the meeting is the last to depart, he or she may then push the print button 54 to obtain a hard copy 58 indicating the real time, elapsed time of the meeting and the total cost of the meeting. At the same time, the manager may wish to depress a reset button 160, FIG. 1, which will connect the registers 38 and 44 as well as the elapsed time electronics 48 to ground for clearing these devices.

Referring once again to FIGS. 1-5, it will be understood that the electronics shown in FIG. 4 mounted within box 14 may be mounted in any convenient container including the display device 12. A power supply 62 may also be provided within the box 14 of input device 10 or within the display device 12. Further, the push buttons 20 which energize the meeting timer may be replaced by other devices such as a magnetic card reader which would automatically scan a magnetic strip upon an employee's security badge and select the rate of that employee to be applied through the logic unit 36 to the memory register 38. In this situation, the employee would only have to insert a badge into the input device 10 and push the appropriate enter and exit button. Another alternative would be to provide an enter and exit slot into which the employee could insert a badge, thus eliminating the need for switches 24 and 26. Further, in some applications it may be appropriate to eliminate the real time clock and display the printer or the display delay switch.

Figure 5:
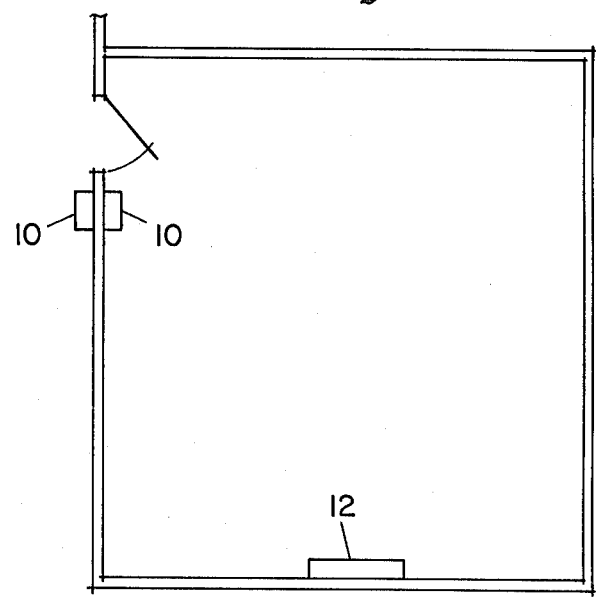
FIG. 5 is a plan view of a meeting room showing possible locations for the input and display devices.

As seen in FIG. 5, a typical meeting room could be arranged with the input device 10 mounted on the outer or inner wall adjacent the entry door. The display device 12 could be mounted in the same position directly opposite the input device or, alternatively, might be mounted on any appropriate wall. Clearly, the various devices discussed hereinabove may be separated and mounted within separate containers or may be mounted in a single container. These variations are left to the discretion of the individual or company utilizing the meeting cost calculator and/or timer. Therefore, the present invention should limited only by the appended claims.

I claim:

1. A device for calculating the cost and time of a meeting and displaying the cost thereof, comprising:
   input means for selecting the time based compensation rate of each meeting attendee;
   memory means connected to said input means for accumulating the instantaneous selected compensation rates of all meeting attendees;
   timing means for timing the meeting,
   said timing means selectively enabled by said input means and operative to activate said memory means for accumulating the selected compensation rates of all meeting attendees over a time period initiated by said input means; and
   display means connected to said memory means for displaying the accumulated selected rates of said attendees.

2. A device, as claimed in claim 1, additionally comprising:
   a second display means connected to said timing means for displaying real time; and
   a third display means connected to said timing means for displaying elapsed time after being enabled by said input means.

3. A device, as claimed in claim 2, additionally comprising:
   a printer connected to said memory means and said timing means for printing said accumulated meeting cost, elapsed time and real time, respectively.

4. A device, as claimed in claim 1, wherein said input means include:
   a plurality of input switches; and
   a plurality of pre-adjusted rate switches selectively enabled by said input switches and connected to said memory means.

5. A device, as claimed in claim 1, wherein said input means additionally comprises:
   an input add switch connected to said memory means to selectively add said selected rate to said means for accumulating said rates.

6. A device, as claimed in claim 5, wherein said input subtract means additionally comprises:
   an input subtract switch connected to said memory means to selectively subtract said selected rate from said means for accumulating said rates.

7. A device, as claimed in claim 1, wherein said timing means additionally comprises:
   clock means enabled by said input means; and
   second memory means driven by said clock means for accumulating the accumulated selected rates from said first mentioned memory means over a period of time controlled by said clock means.

8. A device, as claimed in claim 7, wherein
   said clock means is disabled by said first mentioned memory means when the accumulated selected rates stored therein attain a prescribed value.

9. A device, as claimed in claim 1, additionally comprising:
   delay means connected between said timing means and said display means to delay the display of the accumulated selected rate until after a predetermined elapsed time.

10. A device for calculating the cost and time of a meeting and displaying the total cost thereof, comprising:
    a plurality of rate switch means each of which reflects the average cost per unit of time (i.e. rate) of a particular class of persons expected to attend a meeting;
    an arithmetic logic unit (36) connected to said plurality of rate switch means;
    a plurality of input switch means (20) each connected to energize one respective rate switch means thereby to select and apply the respective rate to said arithmetic logic unit;

memory means for accumulating and storing each rate as applied to said arithmetic logic unit;

clock means selectively enabled by said plurality of input switch means;

a second arithmetic logic unit connected to said memory means and energized periodically by said clock means;

a second memory means for accumulating and storing said respective rate from said first mentioned memory means during consecutive time units as determined by said clock means; and display means connected to said second memory means for displaying the total accumulated, selected rates of said attendees during said time units as a total cost of said meeting.

11. A device, as claimed in claim 10, additionally comprising:

an elapsed timer connected to said clock means; and a display connected to said elapsed timer to display elapsed time.

12. A device, as claimed in claim 10, wherein said plurality of rate switch means include adjustable switch means to permit periodic adjustment of the rate of each class of attendees.

13. A device, as claimed in claim 12, wherein said clock means is disabled by said first mentioned memory means when the accumulated rate stored therein reaches a prescribed value signifying that the last of said attendees has exited said meeting.

14. A device, as claimed in claim 10, wherein said plurality of input switch means includes:

a first switch means including at least one switch for each class of meeting attendees;

a second switch means to add the rate of said class selected by said attendee to said first mentioned memory means through said first mentioned arithmetic logic unit as said attendee enters said meeting; and a third switch means to subtract the rate of said class selected by said attendee from said first mentioned memory means through said first mentioned arithmetic logic unit as said attendee exits said meeting.

15. A device, as claimed in claim 10, additionally comprising:

a delay connected between said second memory means and said display to delay the display of the total cost of said meeting.

16. A device, as claimed in claim 10, additionally comprising:

a printer connected to said display means to print said total cost of said meeting.

17. The device in claim 1 wherein, said input means includes means selectively adjustable to reflect the average compensation rate of the meeting attendee.

* * * * *